United States Patent [19]

Schuetz

[11] Patent Number: 4,965,039
[45] Date of Patent: Oct. 23, 1990

[54] METHOD OF PREPARING AN AQUEOUS INORGANIC POWDER SLURRY WHICH IS EXTRUDED AND DRIED TO FORM AN INORGANIC ARTICLE

[75] Inventor: James E. Schuetz, Midland, Mich.

[73] Assignee: The Dow Chemical Company, Midland, Mich.

[21] Appl. No.: 239,881

[22] Filed: Sep. 2, 1988

[51] Int. Cl.$^5$ .............................................. B29C 47/88
[52] U.S. Cl. ..................... 264/553; 264/63; 264/175; 264/571; 264/125; 264/211.11; 264/211.12; 264/211.21; 264/349; 419/32; 419/65; 419/67
[58] Field of Search ................... 264/109, 101, 211.11, 264/211.12, 211.21, 349, 63, 125, 119, 553, 571; 419/32, 65, 66, 67

[56] References Cited

U.S. PATENT DOCUMENTS

| | | | |
|---|---|---|---|
| 2,883,297 | 4/1959 | Jeitner | 264/211.11 |
| 2,939,199 | 6/1960 | Strivens | 264/101 |
| 3,320,044 | 5/1967 | Cole et al. | 264/63 |
| 3,390,100 | 6/1968 | Chomitz et al. | 264/211.11 |
| 3,442,668 | 5/1969 | Fenerty et al. | 264/63 |
| 3,485,904 | 12/1969 | Ostrowski | 264/63 |
| 3,989,518 | 11/1976 | Rueckl et al. | 75/211 |
| 3,998,917 | 12/1976 | Adelman | 264/63 |
| 4,113,480 | 9/1978 | Rivers | 75/214 |
| 4,391,772 | 7/1983 | Bonnor et al. | 419/23 |
| 4,564,485 | 1/1986 | Eschner et al. | 264/211.11 |
| 4,595,558 | 6/1986 | Baldwin et al. | 419/66 |
| 4,641,221 | 2/1987 | Khoury et al. | 361/321 |
| 4,710,227 | 12/1987 | Harley et al. | 106/193 |
| 4,721,599 | 1/1988 | Nakamura | 419/23 |

Primary Examiner—Jeffery Thurlow

[57] ABSTRACT

A method of making an inorganic slurry, forming the inorganic slurry into a useful article and method of removing the solvent medium from the formed article. The slurry contains an inorganic powder, water, dispersant, thermally gelable polymeric binder and optionally a plasticizer. The method comprises admixing the inorganic powder, water and dispersant to form a blend. The blend is a ball milled, heated, and admixed with a thermally gelable polymeric binder to form a slurry mixture, then the mixture is cooled. The slurry mixture can be extruded to form useful articles, such as metal or ceramic tapes. Additionally, the invention is also a method of final shaping and removing solvents from the formed article. A heated calendar roll stack assembly is used to rapidly remove the solvent from the article. When sintered, the resulting article is very dense and exhibits substantially no voids.

26 Claims, 1 Drawing Sheet

METHOD OF PREPARING AN AQUEOUS INORGANIC POWDER SLURRY WHICH IS EXTRUDED AND DRIED TO FORM AN INORGANIC ARTICLE

BACKGROUND OF THE INVENTION

Many forming techniques have been developed for fabricating inorganic powders into useful shapes. Typical techniques used in the industry include slip casting, tape casting, isostatic pressing, extrusion, roll compacting and the like. These processes typically include dispersion of the powder in a solvent medium, use of an organic binder to hold the article together during and after the forming process, thermally decomposing the binder and sintering the article.

There are many difficulties with previously practiced techniques for fabricating inorganic powders. For instance, when dispersing the powder in the solvent medium, if the powder is not uniformly dispersed, then the undispersed powder agglomerates. The undispersed powder causes voids in the sintered article. The binder must also be uniformly dispersed due to similar effects. Generally, it is difficult to uniformly disperse the inorganic powder and binder in the solvent medium.

Another problem with the previously practiced technique is that it is also difficult and expensive to remove the solvent medium. Typically, for roll-compacted substrates, water is removed by an expensive spray drying process. For organic-based tape casting processes, the solvent is removed by heated air, then recovered in an expensive solvent recovery system.

More in particular, difficulties arise if the powder, binder and other ingredients are dry blended. For instance, when the binder is dry blended with the inorganic powder, and water is added to form a slurry, the dry ingredients are incompletely dispersed in the slurry. The resulting article, after sintering, has large variations in density and porosity due to the incomplete dispersion of the powder and/or binder in the slurry mixture. Another blending technique practiced in the industry is to externally solubilize the binder in water and then to add the inorganic powder to the solution. The use of this technique results in the need to add additional water, which in turn reduces the total percent solids of the slurry, causing the mixture to have an undesirable pseudoplastic flow characteristics.

In view of the prior art, it would be desirable to provide a method for homogeneously dispersing an inorganic powder and a thermally gelling polymeric binder in a solvent medium without negatively affecting the pseudoplastic flow of the mixture. It would also be desirable to have an inexpensive process to rapidly remove the solvent medium from a formed article.

SUMMARY OF THE INVENTION

The present invention includes a method of making an inorganic slurry, forming the inorganic slurry into a flexible article and a method of rapidly removing the solvent medium from the formed article.

The slurry is prepared by admixing an inorganic powder, water and a dispersant to form a blend. The blend is ball milled, heated, and admixed with a thermally gelable polymeric binder to form a slurry mixture, then cooled. The blend is heated so that the thermally gelable polymer is effectively dispersed in the slurry. The inorganic powder can be a metal or a ceramic powder.

The slurry is extruded through a tape die to form a flexible article. The extruded tape is formed into final shape and the solvents are removed by passing the article through a heated calendar roll stack assembly. The calendar roll stack assembly is heated to a temperature to effectively, thermally gel the binder, thereby shaping said article. Additionally, the slurry mixture could also be vacuum formed, thereby final forming the said article.

The slurry mixture can be extruded and formed to make a variety of articles. The articles could be rods, tubes, tapes, sheets, films, resistors, plates monoliths and the like. These articles have a variety of uses in many different types of industries.

The method of preparing the slurry mixture enables homogenous dispersion of the inorganic powder and thermally gelling polymeric binder in the solvent medium without substantial agglomeration. The used of heated calendar rolls is an effective way to remove the solvent system while final forming the article. The resulting article is very dense and exhibits substantially no voids.

BRIEF DESCRIPTION OF THE FIGURES

The FIGURE is a side view of a calendar roll stack assembly. Referring specifically to the drawing, in accordance with an illustrative embodiment demonstrating objects of the present invention, an extruded article is passed between rolls 1 and 2, around roll 3 over roll 4 then through rubber snub rolls 5 and 6.

DETAILED DESCRIPTION OF THE INVENTION

Figure 1:
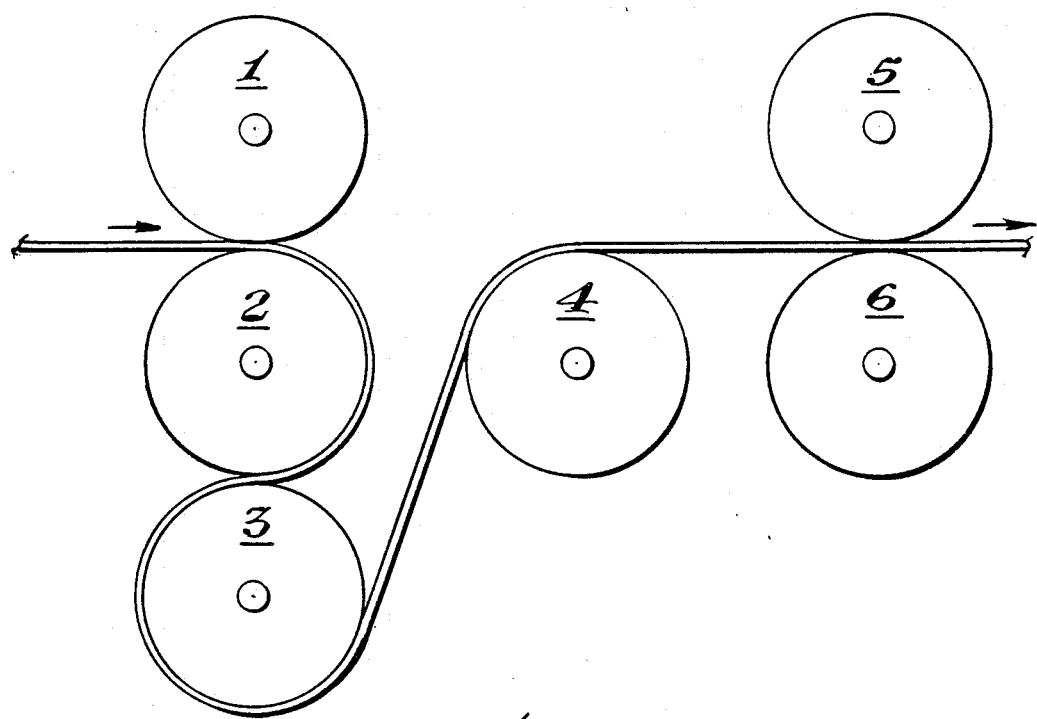

This invention is a method of preparing a homogeneous, aqueous, inorganic slurry mixture which is rapidly dried by a process which forms a high green density inorganic article.

The homogeneous, aqueous, inorganic slurry mixture comprises ingredients which include an inorganic powder, a dispersant, a thermally gelable polymeric binder and water. The inorganic powder used can be a ceramic powder such as oxides, carbides, nitrides, silicides, titinates, borides, sulfides, phosphides and mixtures thereof. The inorganic powder could also be a metal powder such as stainless steel, carbonyl iron, nickel, cobalt, iron, tungsten, molybdenum, tantalum, titanium, chromium, niobium, boron, zirconium, vanadium, silicon, palladium, hafnium, aluminum, copper, alloys or mixtures thereof.

The dispersant used can be ammonium salt of a polyacrylate or a similar salt. Optionally, a plasticizer could be added to the slurry. The plasticizer is typically selected from the group of glycerine, polyethylene glycol and triethanol amine and polypropylene glycol.

The thermally gelable polymeric binder can be methylcellulose, hydroxypropyl methylcellulose, hydroxybutyl methyl cellulose, and hydroxyethyl methylcellulose. These polymers are typically insoluble in hot water, but soluble in cold water. By "thermally gelable polymeric binder" is meant that the polymer when in an aqueous solution will gel upon application of heat. Such polymers have thermal gelation temperatures which may be modified by adding more binder, or less water, either of which would decrease the temperature needed to reach the thermally gelable temperature.

Thermally gelable polymers employed in this invention are water-soluble. Therefore, to aid in the homogeneous dispersion of the inorganic powder and polymeric binder, an aqueous solvent is used. Preferably, water is selected as the aqueous solvent, although a solvent which is up to about 20 weight percent alcohol can also be used.

To prepare the slurry mixture, the inorganic powder, water, dispersant and optionally the plasticizer are admixed to form a blend. The blend is ball milled for a sufficient time to completely disperse the ingredients in the water and to obtain the desired particle size. Generally, the blend is ball milled for about 30 minutes to about 24 hours, preferably from about 4 to about 20 hours. Typically, the particle size is from about 0.5 to about 5 microns. The blend is then heated so that the temperature is greater than the gelation point of a polymeric binder, which is subsequently added. Generally, the blend is heated to a temperature from about 50° C. to about 100° C., preferably from about 70° C. to about 90° C.

The heated blend is admixed with the thermally gelable polymeric binder to form a slurry mixture. Preferably, the binder is preheated to prevent a temperature drop in the slurry mixture. The binder can be preheated from about 50° C. to about 100° C., preferably from about 70° C. to about 90° C. After the addition of the binder, the slurry mixture is cooled to allow complete hydration of the thermally gelable polymeric binder in the mixture.

The slurry has high percent solids. More particularly, the slurry has from about 80 to about 90 weight percent solids. The percent solids of the slurry can be appropriately adjusted to alter the pseudoplastic flow of the slurry mixture if so desired, thereby permitting numerous alternative ways of fabricating the slurry mixture into useful articles. Typical types of fabricating techniques that could be employed include injection molding, vacuum forming, coextrusion, and the like. Also, standard processing equipment can be used for fabricating a variety of articles. Furthermore, along with adjusting the amount of the water and/or inorganic powder, the pseudoplasticity of the slurry mixture can be adjusted by alternating the type and concentration of the cellulose ether used.

Generally, the slurry mixture is from about 80 to about 98 weight percent inorganic powder, from about 1 to about 10 weight percent thermally gelable polymeric binder, from about 0.1 to about 2 weight percent dispersant, optionally from about 1 to about 10 weight percent plasticizer, and water is added in an amount sufficient to give from about 70 to about 90 weight percent solids.

Preferably, the slurry mixture is from about 85 to about 95 weight percent inorganic powder, from about 2 to about 8 weight percent thermally gelable polymeric binder, from about 0.2 to about 1.5 weight percent dispersant, optionally from about 2 to about 8 weight percent plasticizer, and water is added to give from about 75 to about 88 weight percent solids.

Most preferably, the slurry mixture is from about 90 to about 96 weight percent inorganic powder, from about 2 to about 5 weight percent thermally gelable polymeric binder, from about 0.3 to about 0.7 weight percent dispersant, optionally from about 2 to about 5 weight percent plasticizer, and water is add to give from about 78 to about 88 weight percent solids.

The slurry mixture can be extruded into a flexible article, which after sintering is very dense. The inorganic slurry mixture is very viscous and pseudoplastic in character, thereby easily extruded. In order to feed the viscous slurry mixture into an auger or screw extruder, a feed system is designed such that the viscous slurry mixture is delivered to the feed end of the extruder at a constant rate.

Typically, the viscous slurry mixture is placed into a cylinder hopper of an extruder. A piston is pushed with pressurized air into the cylinder hopper. A vacuum can be applied to the contents of the cylinder in order to remove entrapped air. Air pressure of from about 10 to about 200 psi input is applied onto the piston which pushes the viscous mixture into the extruder screw. Various extrusion rates can be achieved by varying the screw rpm.

The extruder is operated at ambient condition. It is important that the temperature of the extruder be below the gel point of the thermally gelable polymeric binder, but high enough to preclude sticking to the die. In general, the temperature range is from room temperature to the on set of gelation. Preferably, the extruder temperature can be from about 20° C. to about 30° C. As the amount of water, type and concentration of the cellulose ether and plasticizer all affect the gelation temperature, the extruding temperature needs to be optimized for any formulation change.

The various thickness and width of an article, in particular a tape, can be made by attaching an adjustable die, tape die, onto the extruder. Although any size tape can be made, generally one inch to 36 inches width and 0.005 to 0.125 inches thick are the most commonly preferred.

After the tape has been formed by the tape die, it is passed through a calendar roll stack assembly. The extruded tape is passed between rolls 1 and 2, around roll 3 over roll 4 and then through rubber snub rolls 5 and 6, as shown in FIG. 1, although the route of the article through the stack assembly could be altered. The calendar rolls are heated to a temperature of from about 50° C. to about 150° C. By heating the calendar rolls, the water is easily removed in a single step from the greenware tape composition. This is an inexpensive alternative from expensive spray or recovery systems for emission control. By quickly removing the water and dispersant from the extruded tape, the heated calendar rolls function as a readily assembled drier. The heated rolls can be used in an embossing mode. The surface finish of the heated metal rolls can also be adjusted to impart any desired finish to the tape. The tape can be sintered to high density with uniform porosity.

In addition to the use of a calendar roll system forming a shaped tape article, other thermoplastic processing techniques may be used after extrusion of the tape article. For instance, after extruding the tape, the tape may be vacuum formed with heat so that the formed shape is retained via the thermal gelation phase change of the polymeric binder. Alternatively, the slurry mixture may be extruded into a parison, then a heated mold is clamped around the parison. In this process, the polymeric binder is also thermally gelled so that the formed shape is retained.

EXAMPLE 1

Preparing the Blend

The following ingredients are admixed to form a slurry:

Composition A 2760 grams $Al_2O_3$ 33 grams triethanolamine
12 grams polyethylene glycol—E 400*
15 grams polypropylene glycol—P 1200*
7 grams ammonium salt of a polyacrylate
839 grams deionized water
*Available from The Dow Chemical Company, Midland, Mich.

The blend is then added to a 1 gallon ball mill and is milled for 20 hours. The milled blend is placed into a Hobart mixing bowl with a heating mantel around the bowl and covered with aluminum foil to eliminate water loss. The blend is continuously mixed until the temperature reaches 70° C. 120 Grams of hydroxypropyl methylcellulose, preheated to 90° C., is added to the blend to form a slurry mixture, the heating mantel is removed and mixing is continued while the mixture is cooling.

The final slurry mixture comprises:
92 weight percent $Al_2O_3$
1.1 weight percent triethanolamine
0.4 weight percent polyethylene glycol
0.5 weight percent polypropylene glycol
2.0 weight percent glycerine
4.0 weight percent hydroxypropyl methylcellulose,
and deionized water to give 78 percent solids Composition B 3680 grams $Al_2O_3$
40 grams triethanolamine
80 grams glycerine
9.2 grams ammonium salts of a polyacrylate
990.8 grams water The blend is added to a 1 gallon ball mill and is milled for 20 hours. The milled blend is placed into a glass bowl and is microwaved for approximately 20 minutes, until the temperature reaches 90° C. The heated blend is mixed in a Hobart mixer. 200 Grams of hydroxypropyl methylcellulose is preheated to 90° C. and is added to the heated blend to form a slurry mixture. The slurry is mixed until it becomes viscous. The mixture is refrigerated overnight.

Final Composition 92 weight percent $Al_2O_3$
1.0 weight percent triethanolamine
2.0 weight percent glycerine
5.0 weight percent hydroxypropyl methylcellulose
0.25 weight percent ammonium salt of a polyacrylate,
and deionized water to give 80 weight percent solids.

EXAMPLE II

Extruding the Slurry Mixture into a Tape Composition

In order to feed the viscous slurry into an extruder, the following feed system is designed and operated as described below:

A 4 ¾ inch diameter x 8 inches long stainless steel hopper, equipped with a gate valve at the bottom is attached to the feed end of a Haake ¾ inch extruder. The inorganic slurry mixture is placed into the hopper.

A piston equipped with a rubber O-ring for sealing is attached to a double acting air cylinder. The piston is pushed with low air pressure into the cylinder which contains the slurry mixture. A vacuum is applied for 5 minutes to remove entrained air. 165 psi air pressure is applied onto the piston, thereby pushing the slurry mixture into the extruder screw. One may vary the extrusion rates by varying the screw rpm.

Extruding Composition

Slurry mixture of I-B is extruded at room temperature, through a ¾ Haake extruder at 15 rpm with 165 psi air pressure on the feeder piston. A 4 inch adjustable tape die is attached to the extruder and a 4.0 inch wide, 0.02 inch thick tape composition is made.

EXAMPLE III

Drying/Finishing an Extruded Article

The 4.0 inch wide, 0.020 inch thick extruded tape from Example II is passed through a heated calendar roll stack assembly as in the FIGURE. The roll temperature of the roll stack is 80° C. and has a 0.019 inch gap between rolls 1 and 2, with a line speed of 11.1 inch per minute. After passing through the calendar roll assembly, the tape is analyzed to have the following properties:

Tape after drying

Width-3.68 inches
*Thickness-0.0187 inches
*Tensile Strength (psi), machine direction, =534
*Tensile Strength (psi), transverse direction, =434
Percent Elongation, machine direction, =12
Percent Elongation, transverse direction, =4
*Procedure for measuring thickness and tensile strength is the following: 0.500 x 2.0 inch strips of the extruded tape are cut and conditioned for 72 hours at 72° F., 50 percent relative humidity and then the strips are tested with an Instron Tester.

Samples of the extruded tape are sintered in air for 30 minutes at 1550° C. The sintered article is analyzed to have the following properties:

Sintered Tape

Sintered density =3.78 g/cc.
Percent shrinkage, machine direction, =17.4 percent
Percent shrinkage, Transverse direction, =17.2 percent Processes of Examples II-III can also be done as a continuous process.

What is claimed is:

1. A method of preparing an inorganic powder slurry which comprises:
    (a) admixing an inorganic powder, water and a dispersant to form a blend,
    (b) ball milling said blend,
    (c) heating said blend so that the temperature of the blend is greater than the gelation point of the thermally gelable polymer binder to be subsequently admixed in step (d),
    (d) admixing said heated blend with a thermally gelable polymer binder to form a slurry mixture, wherein the thermally gelable polymeric binder is effectively dispersed in the slurry, and wherein said slurry mixture has from about 70 to about 90 weight percent solids, and
    (e) cooling said slurry mixture.

2. The improved method as in claim 1, wherein the blend is heated to a temperature of from about 50° C. to about 100° C.

3. The improved method as in claim 1, wherein the inorganic slurry also contains a plasticizer.

4. The claim as in claim 3, wherein the plasticizer is selected from the group consisting of glycerine, polyethylene glycol, propylene glycol, triethanol amine and polypropylene glycol.

5. The method as in claim 1, wherein the inorganic powder is a metal powder.

6. The method as in claim 5, wherein the metal is selected from the group consisting of stainless steel, carbonyl iron, nickel, cobalt iron, tungsten, molybdenum, tantalum, titanium, chromium, niobium, boron, zirconium, vanadium, silicon, palladium, hafnium, aluminum, copper, and alloys thereof and mixtures thereof.

7. The method as in claim 1, wherein the inorganic powder is a ceramic powder.

8. The method as in claim 7, wherein the ceramic powder is selected from the group consisting of oxides, carbides, nitrides, silicides, borides, titinates, sulfides, phosphides and mixtures thereof.

9. The method as in claim 1 wherein the dispersant is an ammonium salt of a polyacrylate.

10. The method as in claim 1 wherein the slurry comprises: from about 80 to about 98 weight percent inorganic powder, from about 1 to about 10 weight percent thermally gelable polymeric binder, from about 0.1 to about 10 weight percent plasticizer, from about 0.1 to about 2 weight percent dispersant, and with a sufficient amount of water to give from about 70 to about 90 weight percent solids.

11. The method as in claim 1 wherein the binder is a cellulose ether.

12. The method as in claim 11 wherein the cellulose ether is selected from the group consisting of methylcellulose, hydroxypropyl methylcellulose, hydroxybutyl methylcellulose, and hydroxyethyl methylcellulose.

13. The method as in claim 1 wherein the slurry comprises about 75 to about 88 weight percent solids.

14. A method of extruding a flexible article comprising
(a) extruding an inorganic slurry mixture containing a dispersant, a thermally gelable polymeric binder, and water through a die to form a flexible formed article, wherein said slurry mixture has from about 70 to about 90 weight percent solids, and
(b) final shaping the configuration of said formed article by passing said article through a heated calendar roll stack assembly, wherein said heated calendar rolls are heated to a temperature effective to thermally gel the binder and remove the solvents from the article, thereby final shaping said article.

15. The method as in claim 14, wherein the article is a flexible tape.

16. The method as in claim 14, wherein the inorganic powder is a metal powder.

17. The method as in claim 16, wherein the metal is selected from the group consisting of stainless steel, carbonyl iron, nickel, cobalt, iron, tungsten, molybdenum, tantalum, titanium, chromium, niobium, boron, zirconium, vanadium, silicon, palladium, hafnium, aluminum, copper, alloys thereof and mixtures thereof.

18. The method as in claim 14, wherein the inorganic powder is a ceramic powder.

19. The method as in claim 18, wherein the ceramic powder is selected from the group consisting of oxides, carbides, nitrides, silicides, borides, titanates, sulfides, bariums, phosphides, and mixtures thereof.

20. The method as in claim 14, wherein the dispersant is an ammonium salt of a polyacrylate.

21. The method as in claim 14, wherein the binder is a cellulose ether.

22. The method as in claim 21, wherein the cellulose ether is selected from the group consisting of methylcellulose, hydroxybutyl methylcellulose, hydroxypropyl methylcellulose, and hydroxyethyl methylcellulose.

23. The method as in claim 14, wherein the inorganic slurry contains a plasticizer.

24. The method as in claim 23 wherein the plasticizer is selected from the group consisting of glycerine, polyethylene glycol, propylene glycol, triethanol amine and polypropylene glycol.

25. The method of claim 1, further comprising:
(f) extruding said slurry mixture through a die to form an article; and
(g) final shaping the configuration of said article by vacuum forming at a temperature sufficient to thermally gel the binder, thereby final shaping said article.

26. The method as in claim 1, further comprising:
(f) extruding the slurry mixture through a die to form a flexible formed article, and
(g) final shaping the configuration of said formed article by passing said article through a heated calendar roll stack assembly, wherein said heated calendar rolls are heated to a temperature effective to thermally gel the binder, thereby final shaping said article.

* * * * *